United States Patent Office 3,437,122
Patented Apr. 8, 1969

3,437,122
CORD DIP OF IMPROVED STABILITY
Gerard E. van Gils, Cuyahoga Falls, Ohio, assignor to the General Tire & Rubber Company, Akron, Ohio, a corporation of Ohio
No Drawing. Filed Mar. 1, 1965, Ser. No. 436,274
Int. Cl. B60c 19/00
U.S. Cl. 152—330
15 Claims

ABSTRACT OF THE DISCLOSURE

A textile-to-rubber latex adhesive of exceptional stability corresponding to the aqueous dispersion produced by combining and mixing together a rubber latex, resorcinol or other dihydric phenol, at least 1 mole of formaldehyde per mole of the dihydric phenol, and at least ½ mole of ammonia per mole of said phenol, either the ammonia or the formaldehyde being added last during the combining and mixing, the ammonia being added before there is substantial condensation of the dihydric phenol and the formaldehyde, whereby a water-insoluble resin is formed in situ in the latex.

---

The present invention relates to a novel resinous compound and an improved adhesive composition containing such compound and more particularly to an improved cord adhesive for rubber tires which may be stored for long periods of time before being used.

Heretofore, rubber latices have been used to improve the adhesion between cord fabric and rubber, and heat-hardenable resorcinol-formaldehyde resins have been incorporated in the latex to improve the adhesion to cords made of nylon or rayon as disclosed, for example, in U.S. Patent No. 2,561,215. A typical cord dip for manufacture of pneumatic rubber tires comprises a latex of a copolymer of butadiene and a vinyl pyridine, a heat-hardenable resorcinol-formaldehyde resin, and excess formaldehyde to convert the resin to the infusible state when the cords were heated. Adhesion is improved by adding a suitable base, such as ammonia, to the dip bath to adjust the pH before applying it to the cords. While latex adhesive dips of this type are very effective, they are considered unreliable if used several days after initial preparation and they cannot be stored, transported or sold in concentrated form.

Attempts have been made to improve the shelf life of latex tire cord adhesives. One solution to the problem is to employ with the latex a water-soluble resorcinol-formaldehyde resole resin and a special type of formaldehyde-donor, such as trimethylol melamine, as disclosed in my copending application Ser. No. 154,064, now U.S. Patent No. 3,194,294, issued July 13, 1965, whereby the latex adhesive can be stored for many months at room temperature after preparation without sacrificing adhesive strength in the rubber tire. However, this type of adhesive is satisfactory only if prepared carefully and under the proper conditions. Also, it does not provide maximum adhesion to tire cords made of rayon.

The present invention involves the discovery of a a new type of polymerization system which makes it possible to obtain a high quality tire cord adhesive with a long shelf life without stringent control of the reaction conditions. According to the invention, ammonia is caused to react with formaldehyde and resorcinol or other dihydric phenol to form an intermediate stage resin or polymerization product which is stable at room temperature and which further polymerizes upon heating the mixture to form an infusible hardened resin. The stable thermosetting material may be mixed with or formed in a conventional rubber latex to form a tire cord dip bath, and such dip batch may be used many months after initial preparation without serious loss of adhesive strength in the final tire.

The ammonia, formaldehyde and resorcinol react to produce a novel polymerization product having recurring groups of the formula

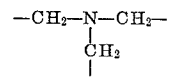

and having dihydroxy benzene groups attached to the methylene groups. At moderate temperatures below 150° F. there is produced an intermediate stage thermosetting resin which is stable at room temperature and may be stored for 6 months or more. However, heating of the material to higher temperatures, such as 250° F., apparently causes crosslinking and hardening of the resin.

The ammonia, formaldehyde and resorcinol are preferably reacted in situ in the rubber latex so that the intermediate stage resin after formation is bonded to the rubber latex particles and cannot be separated therefrom by centrifuging.

An object of the present invention is to provide a novel polymerization system particularly useful in adhesives.

A further object of the invention is to provide an intermediate stage polymer or resin which can be stored for an indefinite period of time and later converted to the final crosslinked stage by application of heat.

Another object of the invention is to provide a tire cord latex adhesive which may be transported or stored for an extended period of time before being diluted with water to form a dip bath.

Another object of the invention is to provide a tire cord latex adhesive of long shelf life which can be prepared easily under widely varying conditions.

A still further object of the invention is to provide a stable tire cord adhesive which adheres well to both nylon and rayon tire cords.

These and other objects, uses and advantages of the invention will become apparent to those skilled in the art from the following description and claims.

The latex adhesive dip of this invention is intended to replace the conventional ammoniated tire cord dip which is made by adding 2 moles of formaldehyde to 1 mole of resorcinol, allowing the materials to react to form a resorcinol-formaldehyde resole resin, mixing the materials including the unreacted formaldehyde with the rubber latex, and adding ammonia to adjust the pH to at least 9. In this system, the ammonia apparently does not react with the resole resin. Thus it is known in the art that ammonia can be used with resorcinol and excess formaldehyde after formation of an A-stage or intermediate stage resorcinol-formaldehyde resin. However, prior to this invention any ammonia used to adjust the pH was added only after formation of the heat-hardenable resin and not before (see U.S. Patent No. 2,429,397).

It has now been discovered that a novel type of heat-hardenable polymer or resin or a mixture of resins is produced by reacting ammonia with formaldehyde and a dihydric phenol, such as resorcinol or homologues thereof, provided that the dihydric phenol is present during the reaction of the ammonia and the formaldehyde. Apparently the first step is the reaction of formaldehyde with ammonia to form trimethylol amine as shown by calorimetric investigation, but the isolation of the amine is not possible because it is unstable. As it is formed the trimethylol amine reacts with the resorcinol present in the reactor, the reaction perhaps proceeding substantially as follows:

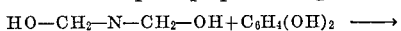

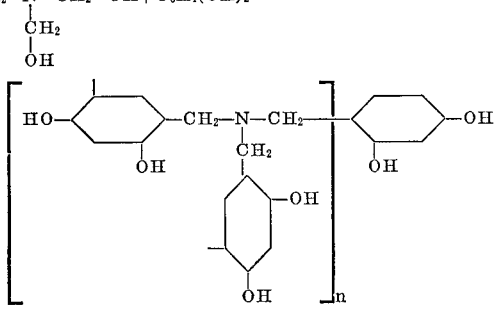

Another possible formula for the resulting resorcinol-formaldehyde-ammonia (RFA) polymer is as follows:

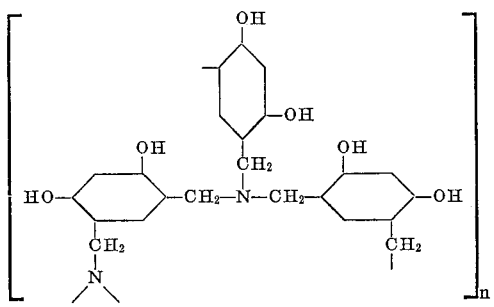

Because resorcinol itself and the resorcinol group of the RFA compound has several free active positions providing sites for attachment of the ring to a methylene group, it is possible for crosslinking to occur in different ways. However, as in the above formulas, the free active positions which are para to the hydroxyl groups are most likely to connect to the methylene groups, which are connected to the nitrogen atoms of the polymer.

While best results are obtained using resorcinol, it will be understood that all or part of the resorcinol may be replaced by other polymerizable dihydric phenols having 2 to 4 free active positions, such as catechol, quinol, meta cresol or other homologues, or mixtures of dihydric phenols.

The aldehyde used to form the polymer of this invention is preferably formaldehyde but may be a material which releases formaldehyde, paraformaldehyde, or a mixture of formaldehyde and acetaldehyde.

Ammonia is the preferred nitrogen compound in practicing this invention, but part of the ammonia may be replaced with an aliphatic amine, such as one having 2 amino hydrogen atoms, one nitrogen atom, and preferably no more than 20 carbon atoms. Suitable amines include monoethanolamine, N-hexyl amine, monoisopropylamine, 1,6-hexene diamine and other polyamines, and the like having preferably no more than 12 carbon atoms. The monoalkanol amines are preferred.

The ammonia is mixed with the dihydric phenol and the formaldehyde before the latter compounds have had much time to polymerize so as to form a polymer or resin having a series of recurring units of the formula

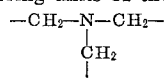

and having the benzene rings of the dihydric phenol connected to the methylene groups. The compound may have some terminal methylol groups. The approximate general formula for the product is as follows:

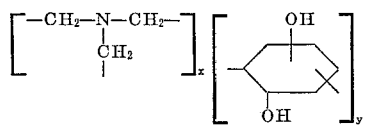

where $x$ and $y$ are integers and $y$ is greater than $x$. When the only nitrogen compound used to form the polymer is ammonia, the integer $y$ is substantially greater than $x$, and the ratio $y:x$ is greater than 1.5:1 and no more than about 2:1 when the polymer is first formed in the rubber latex to provide the adhesive dip bath. The ratio decreases during the final crosslinking of the resin when the treated tire cords are heated and dried under tension because more of the aromatic groups are connected between pairs of methylene groups.

After some crosslinking has occurred, the intermediate stage resin or polymer formed by reacting ammonia, formaldehyde and a dihydric phenol may, for example, have a formula generally as follows:

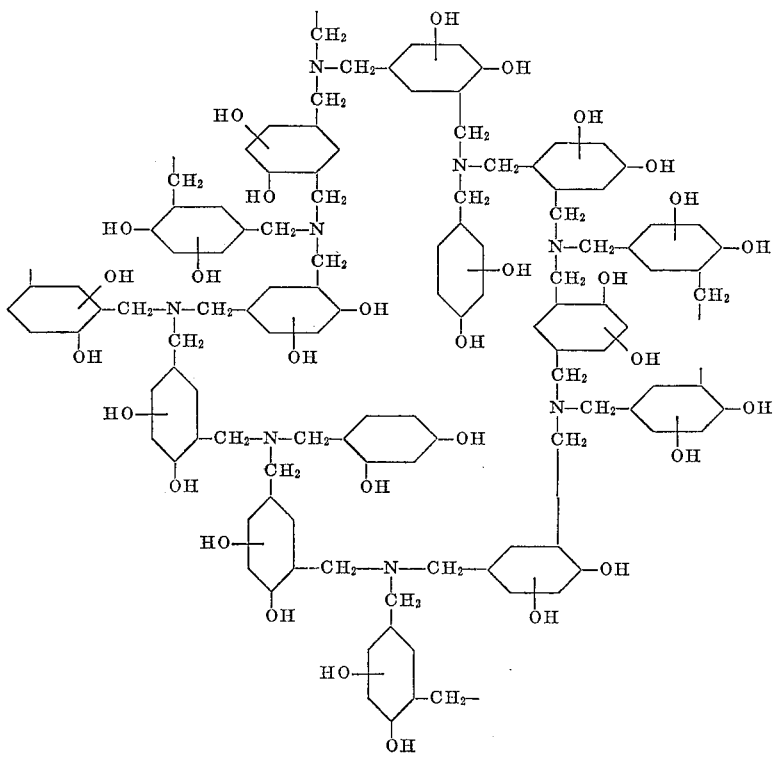

Because the —$C_6H_3(OH)_2$ groups of the polymer have several free active positions on the ring, further crosslinking is possible with free or unreacted ammonia and formaldehyde. In order to avoid excessive crosslinking during initial preparation of the RFA resin of this invention, the temperature should not be excessive and is preferably no more than 150° F., although higher temperatures can be tolerated for short periods of time. The temperature is not critical and can vary considerably, however, and is preferably between about 40° F. and about 120° F. Excellent results are usually obtained when the resin is initially prepared in the rubber latex at a temperature between 60° F. and 90° F.

When the novel resin of this invention is polymerized at moderate temperature by the simultaneous condensation reaction of ammonia, formaldehyde and a dihydric phenol as described above, it is a heat-hardenable intermediate stage resin, similar to an A-stage resin, which is stable at room temperature (70° F.) and which may be stored several months without loss of the needed adhesive characteristics. Such intermediate stage resin is usually stable at temperatures of 120° F. and higher and may be relatively stable at a temperature of 150° F. or substantially higher. Thus, the adhesive dip bath of this invention may be manufactured, stored and shipped as a concentrate to a tire factory for later use. All that is necessary is to dilute the concentrate with water to provide the desired solids content (i.e., 20%) in the tire cord dip bath. Such dip bath may be used in tire cord treating apparatus for rayon or nylon tire cords of the type disclosed, for example, in U.S. Patent No. 2,932,901.

The heating of the intermediate stage RFA resin of this invention to a high temperature, such as 200° F. or 250° F. or substantially higher, can cause crosslinking or hardening of the resin to bond the rubber latex particles to the surface of the synthetic fiber tire cords as the cords are dried under tension in the drying oven. The temperature used to effect crosslinking or hardening of the resin can vary considerably. The hexamethylene adipamide (Type 66 nylon) cords may, for example, be stretched 10 percent or more, heated to a temperature of 250° F. to 300° F. or higher to dry and condition the cords, and cooled while still stretched as disclosed in said Patent No. 2,932,-901. This heating will harden the RFA resin of this invention and provide the needed bond between the rubber latex particles and the tire cord so that there is excellent rubber-to-cord adhesion in the vulcanized rubber tire reinforced with this cord.

In preparing the heat-setting RFA resin of this invention, the amounts of the ingredients may vary considerably and the temperature may also vary considerably. It is thus much easier to prepare a satisfactory adhesive material than is the case with the adhesive dips of my copending application Ser. No. 154,064 now Patent No. 3,194,294. The amounts of the ammonia and the formaldehyde, for example, may be 25 percent and sometimes more than 30 percent greater than that theoretically required to form the polymer. The resin of this invention is usually made by reacting each 1.5 to 4 moles of ammonia with about 3 moles of the dihydric phenol and about 3 to about 7 moles of formaldehyde. It is preferable to employ with every 3 moles of the dihydric phenol, about 5 to about 6 moles of formaldehyde and about 1.8 to about 3 moles of ammonia, the amounts of formaldehyde and ammonia being substantially in excess of that theoretically required so as to facilitate polymerization. The excess is desirable to offset losses due to evaporation during drying of the dipped tire cords or prior to such drying. The excess ammonia and/or formaldehyde may be added after the initial formation of the heat hardenable RFA resin, but the additional step is not necessary. The total number of moles of ammonia used may be substantially in excess of the number of moles of resorcinol but is usually no more than one-third greater than the number of moles of resorcinol.

It is desirable to employ small amounts of an alkaline catalyst, such as sodium hydroxide, when forming the resin of this invention but this is not essential. However, when the resin is formed in the rubber latex by the preferred procedure, acidic conditions must be avoided.

The order of addition of the ingredients can vary considerably but the ammonia or the formaldehyde is preferably added last. Of course, the resorcinol and formaldehyde should not be allowed to react too long before adding the ammonia. The preferred sequences are as follows: latex-resorcinol-formaldehyde-ammonia, latex-formaldehyde-resorcinol-ammonia, latex-resorcinol-ammonia-formaldehyde, and latex-ammonia-resorcinol-formaldehyde. In order to bond the RFA resin to the latex particles and to hold the RFA resin in suspension, it is desirable to add everything to the latex, but this is not essential, particularly when the latex is added before the ammonia and formaldehyde or before the other materials have substantial time to react. It is undesirable to add the ammonia and formaldehyde before a substantial amount of resorcinol is added because the former materials react very rapidly. However, it will be understood that, if desired, the ammonia, formaldehyde and resorcinol may be added to the latex simultaneously in increments or in separate streams.

The type of rubber latex used in the tire cord dip bath of this invention depends on the type of rubber used in the carcass of the tire and the type of synthetic fiber cords used to reinforce the tire. The latex may be a natural rubber latex or an SBR or other synthetic rubber latex or a blend of different rubber polymers. In a passenger car tire, a major portion of the rubber may be SBR rubber, in which case the rubber latex is preferably a latex of a polymer of a diene hydrocarbon containing conjugated double bonds such as an SBR copolymer of butadiene and styrene or a copolymer of butadiene and a vinyl pyridine. It is preferred to employ a latex of a copolymer of a vinyl pyridine and a conjugated diolefin having 4 to 6 carbon atoms. The preferred rubber latex is of the type described in U.S. Patent No. 2,561,215 and comprises an aqueous dispersion of a copolymer of 50 to 95 percent by weight of a conjugated diolefin having 4 to 6 carbon atoms, 5 to 40 percent of a vinyl pyridine, and 0 to 40 percent of a styrene. Examples of suitable vinyl pyridines are 2-vinyl pyridine, 2-methyl-5-vinyl pyridine, and 5-ethyl-2-vinyl pyridine.

Excellent results are obtained in conventional SBR rubber tires or the like using "Gen-Tac" which is a latex of a copolymer of 70% butadiene, 15% styrene and 15% 2-vinyl pyridine having a total solids contents of around 40 percent. In practicing this invention, it is usually preferred to use a latex of a copolymer of 70 to 75% butadiene, 10 to 15% styrene and 10 to 15% of a vinyl pyridine, but this is not essential.

When the tire is to be reinforced with rayon cords rather than nylon cords, it is often desirable to blend the Gen-Tac latex with an SBR rubber latex. Suitable results can be obtained using a blend of 70 to 80% of an SBR rubber latex and 20 to 30% by weight of a latex of a copolymer of butadiene and a vinyl pyridine.

In order to provide comparative data for evaluation of the tire cord adhesive of this invention, a standard single-cord H-pull test is employed to determine the static adhesion at room temperature of the adhesive-coated tire cord to rubber. All the data submitted herein including the examples which follow are based upon identical test conditions, and all test specimens are prepared and tested in the same way generally in accordance with ASTM Designation: D 2138–62T.

In each of the tests the latex adhesive dip is applied to either a conventional 1650/3 rayon tire cord or a conventional 1260/2 nylon tire cord after the cord has been conditioned at least 2 days at 50% relative humidity at 70° F. The former is a 1650 denier-3 yarn rayon cord with a twist of 11.10 per inch, and the latter is a 1260 denier-2 yarn cord of Type 66 nylon with a twist of 10.10 per inch.

In order to apply the latex adhesive to such rayon or nylon cords in a reliable manner, the cords are fed through the adhesive dip bath while being maintained under a small predetermined tension and into a drying oven where they are stretched and dried under a predetermined tension. As the cords leave the oven they enter a cooling zone where they are air cooled before the tension is released. In each case the adhesive-coated rayon cords leaving the dip are dried in the oven at 280° F. for 60 seconds while being stretched 4 percent, and the nylon cords leaving the dip bath are dried in the oven at 420° F. for 25 seconds while being stretched 12 percent using a process similar to that of U.S. Patent No. 2,932,901.

The single-cord H-pull test is then employed to determine the static adhesion of the dried adhesive coated synthetic fiber cords to rubber. In each case the rubber test specimens are made from the same standard type-V rubber composition using the following recipe:

| | Parts by weight |
|---|---|
| Natural rubber (smoked sheets) | 50 |
| 52-Mooney SBR 1502 (cold rubber) [1] | 50 |
| HAF carbon black | 35 |
| Zinc oxide | 3 |
| Antioxidant | 1 |
| Accelerator (Nobs No. 1) | 0.9 |
| Plasticizing oil | 7 |
| Sulfur | 3.2 |

[1] A butadiene-styrene rubber containing 23.5% bound styrene.

In every case the cords to be tested are placed in parallel positions in a multiple-strand mold of the type described in the single-cord H-pull adhesion test designated ASTM D 2138-62T, the mold is filled with unvulcanized rubber of the above composition, the cords being maintained under a tension of 50 grams each, and the rubber is cured 20 minutes at around 300° F. to the elastic state. Each rubber test specimen has ¼ inch by ⅜ inch tabs or embedments.

After the rubber has been cured 20 minutes, the mold is cooled at room temperature (70° F.), the reticulate cured rubber piece is removed from the mold and H-test specimens are cut from said piece, each specimen consisting of a single cord encased in rubber and having each end embedded in the center of a rubber tab or embedment having a length of around 1 inch or so. The specimens are then aged at least 16 hours at room temperature. The force required to separate the cord from the rubber is then determined at 70° F. or 250° F. using a Scott tester provided with specimen grips. The maximum force in pounds required to separate the cord from the rubber is the H-adhesion value.

The above procedure is followed using the same nylon or cords whenever an H-adhesion value is reported herein. When using this procedure with 1260/2 nylon tire cords the conventional ammoniated high pH tire cord dip, aged only 2 or 3 days at room temperature, consistently gives H-adhesion values of 40 to 45 or more and the stable tire cord dip of Patent No. 3,194,294 when prepared properly, provides comparable adhesion values even when stored 6 months or more at room temperature. The adhesive of this invention also provides comparable adhesion values as indicated hereinafter.

It is found that when the reinforcing nylon or rayon cords of a conventional pneumatic rubber tire, which is made of conventional oil-extended styrene-butadiene (SBR) rubber composition or a composition containing a blend of natural rubber and SBR rubber, are treated with the stable latex adhesive dip bath of this invention, there is excellent adhesion of the cords to the rubber during the life of the tire. Also tests seem to indicate improved fatigue resistance of the cords.

The term SBR rubber is applied to copolymers of a major portion of butadiene and a minor portion of styrene, and the term "cold rubber" as used herein refers to a polymer formed at a temperature below 50° F. The identification of SBR rubber polymers is covered by ASTM designation: D 1419-62T. The oil-extended SBR rubbers are described in U.S. Patent No. 2,964,083.

The accelerator "Nobs No. 1" referred to above is a mixture of 90% by weight of n-oxdiethylene benzothiazyl-2-sulfenamide and 10% of benzothiazyl disulfide.

The following examples are intended to illustrate the invention rather than to limit it.

EXAMPLE I

An adhesive dip is prepared from "Gen-Tac," a latex of a copolymer of 70 percent butadiene, 15 percent styrene and 15 percent by weight 2-vinyl pyridine, and from a resin master solution prepared by mixing the following ingredients:

| | Parts by weight |
|---|---|
| Resorcinol | 11 |
| Formaldehyde (37%) | 16.2 |
| Sodium hydroxide | 0.3 |
| Water, soft | 230 |

The latex and the resin master solution are mixed together with additional ingredients using the following recipe:

| | Grams |
|---|---|
| Gen-Tac (41% total solids) | 100 |
| Resin master solution | 105 |
| Water | 25 |
| Ammonium hydroxide (28%) | 3 |

Before there is time for a reaction of the resorcinol and the formaldehyde, all the ingredients except the ammonium hydroxide are mixed together, and the ammonium hydroxide is then added to the mixture which causes a rapid temperature rise that diminishes in a few minutes.

After the resulting latex adhesive dip has been stored 5 months, it is applied to 1650/3 rayon cords and 1260/2 nylon cords, the cords are dried under tension as described previously, and the standard single-cord H-pull static adhesion test is performed using a ¼ x ⅜ inch embedment as described above. The H-test adhesion value for the rayon cords is about 40.4 pounds at 70° F., and the H-test adhesion value for the nylon cords is about 43.8 pounds at 70° F. These adhesion values are excellent and indicate that there is no loss of adhesion due to long storage.

EXAMPLE II

A series of resorcinol-formaldehyde-ammonia (RFA) tire cord dip baths are prepared at different temperatures using the following recipe:

| | Parts by Weight | |
|---|---|---|
| | Dry | Wet |
| Water (First part) | | 270 |
| Water (Second part) | | 100 |
| Resorcinol | 11 | 11 |
| Formaldehyde (37%) | 6 | 16.2 |
| Sodium hydroxide | 0.6 | 0.6 |
| Gen-Tac (41%) | 103 | 250 |
| Ammonium Hydroxide (28%) | 1.7 | 6 |

In preparing each dip bath, the first part of the water is used to dissolve the resorcinol and the second part is used separately, partly to dissolve the sodium by hydroxide and partly to dilute the ammonia. In preparing each of the dip baths 8A, 8B, 8C and 8D, the resorcinol is dissolved in the first part of the water, subsequently the formaldehyde is added, then the sodium hydroxide solution, and immediately thereafter the Gen-Tac latex. These materials are mixed a few minutes in the reactor, which is immersed in a hot or cold water bath, to provide a predetermined initial reaction temperature (as indicated in Table A), and the ammonium hydroxide is then added. This initiates a reaction which causes the temperature to rise rapidly during 30 seconds, the temperature after this reaction (also recorded in Table A) being constant. After 15 minutes, the dip is taken out of the reactor and the properties thereof are recorded in Table A.

In preparing each of the dip baths 8AX, and 8BX, the same procedure is followed except that the formaldehyde is added after the ammonium hydroxide. In other words, the sequence was (1) resorcinol, (2) sodium hydroxide, (3) Gen-Tac latex, (4) ammonia, and (5) formaldehyde.

TABLE A

| Dip No. | Reaction Temperature, °F. | | pH | Surface Tension | Viscosity, cp. | Specific Gravity, 25° C. |
|---|---|---|---|---|---|---|
| | Initial | After | | | | |
| 8A | 46 | 48 | 9.90 | 41.8 | 1.814 | 1.0055 |
| 8AX | 46 | 49 | 9.55 | 41.7 | 1.814 | 1.0055 |
| 8B | 80 | 86 | 9.80 | 41.7 | 1.814 | 1.0055 |
| 8BX | 80 | 87 | 9.70 | 41.5 | 1.814 | 1.0055 |
| 8C | 95 | 100 | 9.95 | 41.8 | 1.814 | 1.0055 |
| 8D | 120 | 124 | 10.05 | 41.7 | 1.814 | 1.0055 |

All of the dips 8A through 8D had good physical properties. The viscosity values indicate the stability of the dips.

In order to determine the H-adhesion values for each of the above dips after various periods of time, the 1650/3 rayon and 1260/2 nylon cords are passed through each dip and dried in the oven under tension, and the standard single-cord H-pull static adhesion test is performed as described previously both at 70° F. and at 250° F. Tables B and C show the H-pull test results after storing the dips at room temperature (70° F.) for various periods of time from 2 days to 60 days and also show the effect of adding water to dip 8C to reduce the total solids (TS) content.

after 60 days storage and that good adhesive dips are obtained at any temperature between 46° F. and 120° F. when the RFA resin is formed in the Gen-Tac latex.

EXAMPLE III

In the pilot plant a 25 gallon batch (M-1) and a 200 gallon batch M-2 are made using the following recipe to prepare each 100 gallons of the tire cord dip:

| | Grams | | Pounds |
|---|---|---|---|
| | Dry | Wet | |
| Water: | | | |
| 1st part | | 250 | 330 |
| 2d part | | 100 | 132 |
| Resorcinol | 11 | 11 | 14.5 |
| Formaldehyde (37%) | 6 | 16.2 | 21.4 |
| Sodium Hydroxide | 0.6 | 0.6 | 0.8 |
| Gen-Tac (41%) | 103 | 250 | 330 |
| Ammonium Hydroxide (28%) | 1.7 | 6 | 8 |

In order to prepare half of the batch M-2, the reactor is first loaded with 330 pounds of water and the resorcinol is added and dissolved by stirring slowly. In the meantime 0.8 pounds of sodium hydroxide is dissolved in 120 pounds of water. After the resorcinol is dissolved, the formaldehyde is added to the solution. The sodium hydroxide solution is then added, and then the Gen-Tac latex is added. The speed of stirring is increased and the ammonia is then added after being diluted with the remaining 12 pounds of water. The temperature in the reactor is 75° F. The rapid stirring is continued for 5 minutes, and then the reaction mixture is stirred slowly for another 30 minutes. The reactor is cooled to main- TABLE B
[H-Adhesion, Pounds Pull, Nylon Cord 1260/2]

| Dip No. | After 2 days, 70° F. | After 8 days, 70° F. | After 28 days | | After 34 days | | After 2 months, 70° F. |
|---|---|---|---|---|---|---|---|
| | | | 70° F. | 250° F. | 70° F. | 250° F. | |
| 8A | 45.9 | 43.7 | 43.6 | 30.8 | | | 39.7 |
| 8AX | 34.6 | 44.4 | 40.9 | 31.0 | | | 41.2 |
| 8B | 43.5 | 44.0 | 43.2 | 31.0 | | | 38.6 |
| 8BX | 41.4 | | | | 45.1 | 31.4 | 44.1 |
| 8D | 46.5 | 45.0 | 40.6 | 30.9 | | | 40.2 |
| 8C (20% TS) | 44.7 | 45.8 | 41.9 | 30.0 | | | 39.4 |
| 8C (15% TS) | | 44.4 | 40.4 | 27.3 | | | |
| 8C (10% TS) | | 44.0 | 38.5 | 24.0 | | | |
| 8C (5% TS) | | 36.1 | 29.8 | 16.8 | | | |

Considering the fact that an H-adhesion value of 40 pounds at 70° F. is excellent and comparable to that obtained with previously used latex adhesive dips such as the ammoniated high pH D-5 dip or the dip of my copending Patent No. 3,194,294, it can be seen from Table B that all of the dips provide good results except where the total solids content is reduced to 5 percent.

tain a temperature of 75° F. which would otherwise increase 6 degrees or so soon after addition of the ammonia. In the reactor at 75° F. the reactor is completed within about one minute. The final product is then discharged from the reactor, filtered through a latex-filtering cloth, and used to form a tire cord dip both with a total solids content of 20 percent by weight.

TABLE C

| Dip No. | After 2 days, 70° F. | After 8 days, 70° F. | After 28 days | | After 34 days | | After 2 months, 70° F. |
|---|---|---|---|---|---|---|---|
| | | | 70° F. | 250° F. | 70° F. | 250° F. | |
| 8A | 56.2 | 51.8 | 48.6 | 24.2 | | | 48.5 |
| 8AX | 47.9 | 45.1 | 44.8 | 22.0 | | | 43.9 |
| 8B | 54.2 | 47.7 | 44.6 | 21.4 | | | 45.0 |
| 8BX | 40.7 | | | | 52.2 | 27.1 | 51.0 |
| 8D | 57.0 | 48.6 | 51.1 | 25.8 | | | 49.6 |
| 8C (20% TS) | 56.1 | 51.2 | 47.8 | 22.1 | | | 48.8 |
| 8C (15% TS) | | 44.5 | 47.7 | 22.9 | | | |
| 8C (10% TS) | | 41.4 | 36.9 | 19.9 | | | |
| 8C (5% TS) | | 32.4 | 29.9 | 15.2 | | | |

It can be seen from Table C that the tire cord dips also provide excellent adhesion to rayon tire cords.

This Example II shows that very good adhesions of the nylon or rayon cords to rubber are obtained even The smaller batch M-1 is made in the same way as the batch M-2 except that the Gen-Tac latex is added after the formaldehyde and before adding the sodium hydroxide solution.

Rayon 1650/3 and nylon 1260/2 tire cords processed in the dips M-1 and M-2 and cured to the standard type-V rubber according to the standard procedure described previously give the following H-adhesion values in pounds pull:

| Dip | Rayon Cords | | Nylon Cords | |
| --- | --- | --- | --- | --- |
|  | 70° F. | 250° F. | 70° F. | 250° F. |
| M-1 | 44.5 | 23.2 | 42.0 | 26.4 |
| M-2 | 44.5 | 21.8 | 43.0 | 27.9 |

The 25 gallon batch M-1 is used for testing the shelf life and the H-adhesion values at 70° F. are determined in the same way. The results are as follows:

| Aging Conditions | Rayon, 70° F., pounds | Nylon, 70° F., pounds |
| --- | --- | --- |
| Twenty days at 78° F. | 44.3 | 40.3 |
| Twenty days at 78° F. then five days at 100° F. | 48.6 | 41.8 |
| Six months at 70° F. | 43.1 | 37.7 |

The effect of elevated temperature aging of the same M-1 dip upon H-adhesion values is shown by the following data:

TABLE D

| Days Aged | 100° F. | | 120° F. | | 158° F. | |
| --- | --- | --- | --- | --- | --- | --- |
|  | Rayon | Nylon | Rayon | Nylon | Rayon | Nylon |
| 3 |  |  | 43.7 | 41.6 | 38.7 | 40.5 |
| 5 | 48.0 | 42.3 |  |  |  |  |
| 6 |  |  | 50.7 | 41.3 | 36.3 | 38.1 |
| 10 |  |  | 44.7 | 40.9 | 33.2 | 36.0 |
| 12 | 46.9 | 43.6 |  |  |  |  |
| 13 |  |  | 38.0 | 37.7 | 33.3 | 31.3 |
| 19 | 49.2 | 39.9 |  |  |  |  |
| 27 |  |  | 35.0 | 39.2 | 29.9 | 20.0 |
| 36 | 38.6 | 39.1 |  |  |  |  |

The data in Table D indicates that the RFA tire cord dip is much more stable at high temperatures than the conventional ammoniated high pH tire cord dip now used in production of tires. Experience in the production of tires has shown that the latter production dip is excellent when used 1 to 3 days after it is prepared but is quite unreliable when stored for more than 4 days at room temperature or above.

The 200-gallon batch M-2 is employed for treating the cords in the building of conventional 750:14 nylon-reinforced and rayon-reinforced pneumatic rubber tires. Pulley wheel tests of these tires shown excellent adhesion of the rubber to the nylon and rayon cords is obtained. However, the preferred total solids content for the rayon tire cord dip is somewhat different than that for the nylon tire cord dip. The tests indicate that the RFA dip gives tire performance comparable to that obtained with the ire cord dips now being used in production of tires and that the RFA dips retain good processing and adhesion properties for at least six months at room temperature, which is not true of the production dips.

EXAMPLE IV

A slurry is prepared using the following recipe:

| | Parts by weight |
| --- | --- |
| Resorcinol | 11 |
| Formaldehyde (37%) | 16 |
| Water | 30 |
| NaOH (1.12 N) | 15 |
| Ammonium hydroxide (28%) | 15 |

All of the ingredients except the ammonia are mixed together, and then maintained at 5° C. to avoid formation of a resole resin. Then the concentrated ammonia is added gradually to cause formation of a precipitate which is accompanied by a rise in temperature. The resulting slurry is then mixed with 250 milliliters of Gen-Tac latex having a solids content of 41% to form a dip bath.

One day later this dip bath is diluted to a solids content of 20 percent and applied to 1260/2 nylon and 1650/3 rayon cords, the cords are dried under tension and the single-cord static H-pull adhesion test is performed as above. The H-adhesion value for the rayon cord is 45.75 pounds pull, and the H-value for the nylon cord is 40.5 pounds pull.

This experiment shows that advantages of the invention can be obtained without forming the RFA resin in situ in the latex. However, this procedure is wasteful because the RFA complex is difficult to keep in suspension and tends to separate from the latex particles. Much better results are obtained by forming the RFA polymer in the latex so that it is bonded to the latex particles and is effective in bonding such particles to the tire cords.

EXAMPLE V

A conventional resin master solution is prepared using the following recipe:

| | Grams |
| --- | --- |
| Resorcinol | 11 |
| Formalin (38%) | 16.2 |
| NaOH | .3 |
| Water | 238 |

The sodium hydroxide and the resorcinol are dissolved in the water and subsequently the 16.2 grams of formalin are added. The resorcinol and formaldehyde are allowed to react at room temperature (70° F.) for 1 hour, and the resin master solution is then used to form a dip bath according to the following recipe:

| | Parts by weight |
| --- | --- |
| Gen-Tac latex (40% total solids) | 153 |
| Water | 37 |
| Resin master solution | 161 |
| Ammonium hydroxide (28%) | 3.5 |

Immediately after mixing the conventional ingredients, the 3.5 parts of concentrated ammonia are added slowly. The resulting dip bath is allowed to stand for 4 days, is then applied to nylon and rayon cords, and the cords are dried and subjected to the single-cord static H-pull adhesion test as described above. The adhesion is satisfactory.

This experiment shows that some advantages of the invention can be obtained if the ammonia is added before there is a substantial reaction of the resorcinol with the formaldehyde and after mixing with the latex; however, much better results can be obtained if the ammonia is added sooner as in the other examples.

In the above examples, a small amount of sodium hydroxide, such as 0.3 or 0.6 part is used with 11 parts of resorcinol and the other reactants. However, excellent results can also be obtained if the sodium hydroxide is omitted or if a different amount (i.e., 0 to 0.6 part) is employed.

An important advantage of the invention is the fact that the RFA dip eliminates the need for precise time and temperature control of the resorcinol-formaldehyde reaction. In Example III, for example, the temperature of the reaction may be from 38° F. to 120° F. without serious variations in the dip stability and H-adhesion values. Satisfactory RFA dips have been made at 38° F. and 120° F., but it is usually preferred to prepare the dips at a temperature between 65° F. and 85° F.

It will also be understood that the amount of ammonia used in the above examples may be reduced considerably. The amount of ammonia used in Example IV, for example, is much more than is required to obtain satisfactory results.

Unless the context shows otherwise, the term "parts" and all percentages are by weight. The term "polymer" is broad enough to cover copolymers, and the term "copolymer" covers terpolymers as well as copolymers.

It will be understood that the above description is by way of illustration rather than limitation and that, in accordance with the provisions of the patent laws, variations and modifications of the specific compounds, compositions, articles and methods disclosed herein may be made without departing from the spirit of the invention.

Having described my invention, I claim:

1. A textile-to-rubber latex adhesive having improved stability consisting essentially of the aqueous dispersion produced by combining and mixing together (a) a rubber latex, (b) resorcinol, (c) at least 1 mole of formaldehyde per mole of resorcinol, and (d) at least ½ mole of ammonia per mole of resorcinol to form a stable water-insoluble resin in the latex, either the ammonia or the formaldehyde being added last during the combining and mixing, the ammonia being added before there is substantial formation of a resorcinol-formaldehyde resin, the aqueous dispersion being maintained alkaline during and after the combining and mixing.

2. An adhesive as defined in claim 1 in which the rubber latex is a latex of a rubber polymer or copolymer of a conjugated diene having 4 to 6 carbon atoms.

3. An adhesive as defined in claim 2 in which there is used at least about 10 parts of resorcinol per 100 parts by weight of rubber latex solids.

4. An adhesive as defined in claim 2 in which there is used 1 mole to 2⅓ moles of formaldehyde and ½ mole to 1 mole of ammonia per mole of resorcinol.

5. A textile-reinforced rubber product in which the textile is bonded to the rubber compound by the adhesive of claim 1.

6. A pneumatic rubber tire in which the textile is bonded to the rubber compound by the adhesive of claim 4.

7. An adhesive as defined in claim 1 in which the resorcinol, formaldehyde and ammonia are added separately.

8. An adhesive as defined in claim 1 in which the reactants are added concurrently to form the adhesive.

9. A process of making a textile-to-rubber latex adhesive having improved stability comprising combining and mixing together a rubber latex, ammonia, formaldehyde and a copolymerizable dihydric phenol having 2 to 4 free active positions to provide an aqueous dispersion, at least ½ mole of ammonia and 1 to 2⅓ moles of formaldehyde being employed per mole of said dihydric phenol, the ammonia being mixed with the dihydric phenol and the formaldehyde before there is substantial condensation of the dihydric phenol and formaldehyde and the dihydric phenol being mixed with the ammonia and the formaldehyde before there is substantial reaction of the ammonia and the formaldehyde so that the dihydric phenol, ammonia and formaldehyde are simultaneously present in the latex until formation of a stable water-insoluble thermosetting condensation resin, the aqueous dispersion being maintained alkaline during and after the combining and mixing.

10. A process as defined in claim 9 in which said dihydric phenol is resorcinol, the resorcinol is added before addition of the formaldehyde and the ammonia, and the reaction is carried out at a temperature not in excess of 120° F.

11. A latex adhesive made by the process of claim 9 wherein said condensation resin consists essentially of a series of recurring groups of the formula

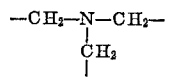

interconnected by dihydroxy benzene rings which are connected to the methylene groups.

12. A textile-to-rubber latex adhesive consisting essentially of rubber latex and an aqueous dispersion of an in situ-formed water insoluble thermosetting condensation resin consisting essentially of a series of recurring groups of the formula

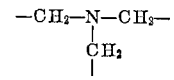

interconnected by dihydroxy benzene rings, one of said benzene rings being connected to each of the three methylene groups carried by the nitrogen atom of each of said recurring groups.

13. A textile-to-rubber latex adhesive having rubber latex particles coated with a stable water-insoluble thermosting condensation resin formed in situ in the latex, said resin corresponding to the reaction product of resorcinol, formaldehyde and ammonia produced in an aqueous dispersion by combining and mixing together a rubber latex, resorcinol, 1 to 2⅓ moles of formaldehyde per mole of resorcinol, and ½ mole to 1⅓ moles of ammonia per mole of resorcinol, the latex and resorcinol being mixed before the formaldehyde and ammonia areadded thereto and the ammonia being added before a resorcinol-formaldehyde resin is formed, and causing the resorcinol, formaldehyde and ammonia to react simultaneously under alkaline conditions at a temperature not in excess of 120° F. to produce said water-insoluble resin in the aqueous dispersion.

14. In a process of making adhesive-coated textile for reinforcing rubber articles in which a latex adhesive prepared from a rubber latex is applied to the textile and the textile is dried and heated to set the adhesive, the steps which comprise combining and mixing together (a) a rubber latex, (b) resorcinol, (c) 1 mole to 2⅓ moles of formaldehyde per mole of resorcinol, and (d) at least ½ mole of ammonia per mole of resorcinol to provide an alkaline aqueous dispersion, the ammonia being added before there is substantial condensation of the resorcinol and the formaldehyde, the resorcinol being added before there is substantial reaction of the ammonia and the formaldehyde, and causing the resorcinol, ammonia and formaldehyde to react concurrently under alkaline conditions until there is formed on the latex particles a stable water-insoluble thermosetting condensation resin, the aqueous dispersion remaining alkaline at the end of the reaction.

15. A textile-reinforced rubber product in which the textile is bonded to the rubber by an adhesive corresponding to that produced by the process defined in claim 9.

References Cited

UNITED STATES PATENTS

| | | | |
|---|---|---|---|
| Re 23,451 | 1/1952 | Mighton | 161—160 X |
| 2,417,975 | 3/1947 | Ebers | 156—181 |
| 2,829,119 | 4/1958 | Dudley | 260—45.2 |
| 2,975,095 | 3/1961 | Bletso. | |
| 3,097,109 | 7/1963 | Danielson | 117—162 |
| 3,194,294 | 7/1965 | Van Gils | 152—330 |
| 3,256,137 | 6/1966 | Danielson | 161—241 |

EARL M. BERGERT, *Primary Examiner.*

C. B. COSBY, *Assistant Examiner.*

U.S. Cl. X.R.

156—110, 335, 338; 161—88, 241, 248; 260—29.3, 845, 846